United States Patent
Harigae et al.

(10) Patent No.: US 7,106,674 B2
(45) Date of Patent: Sep. 12, 2006

(54) REPRODUCTION APPARATUS (75) Inventors: Shinichi Harigae, Osaka (JP); Satoshi Endo, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 381 days.

(21) Appl. No.: 10/467,239

(22) PCT Filed: Aug. 5, 2002

(86) PCT No.: PCT/JP02/07945

§ 371 (c)(1),
(2), (4) Date: Aug. 6, 2003

(87) PCT Pub. No.: WO03/015092

PCT Pub. Date: Feb. 20, 2003

(65) Prior Publication Data

US 2004/0071062 A1   Apr. 15, 2004

(30) Foreign Application Priority Data

Aug. 6, 2001  (JP) .............................. 2001-238143

(51) Int. Cl.
*G11B 7/00* (2006.01)
(52) U.S. Cl. ................................ 369/47.54; 369/53.22; 369/47.55
(58) Field of Classification Search ............. 369/47.54, 369/53.22, 47.55
See application file for complete search history.

(56) References Cited

U.S. PATENT DOCUMENTS

| 2003/0021200 A1* | 1/2003 | Higashi | 369/47.39 |
| 2003/0147323 A1* | 8/2003 | Sako et al. | 369/53.22 |
| 2003/0161233 A1* | 8/2003 | Sako et al. | 369/47.24 |

FOREIGN PATENT DOCUMENTS

| JP | 11283341 | 10/1999 |
| JP | 2000285462 | 10/2000 |

OTHER PUBLICATIONS

International Search Report for PCT/JP02/07945, mailing date Sep. 3, 2002.

* cited by examiner

*Primary Examiner*—Wayne Young
*Assistant Examiner*—Van T. Pham
(74) *Attorney, Agent, or Firm*—RatnerPrestia (57) ABSTRACT In a multi-session disc including both audio session and data session, the data session is correctly recognized and accessed. The reproducing apparatus is a reproducing apparatus of a multi-session disc mixing a session of first type recording first data and a session of second type recording second data different from the first data, comprising an optical pickup for accessing the session of first type and the session of second type, a judging unit for judging a type of the session accessed by the optical pickup, and a limiting unit for limiting the session of first type to a reproducible session when the session of second type judged by the judging unit is present at an access position after the session of first type.

8 Claims, 11 Drawing Sheets

| SESSION 1 | SESSION 2 | SESSION 3 | SESSION 4 | SESSION 5 |
|---|---|---|---|---|
| AUDIO SESSION | DATA SESSION | DATA SESSION | DATA SESSION | DATA SESSION |

Fig.13

REPRODUCTION APPARATUS

BACKGROUND OF THE INVENTION

1. Technical Field

The present invention relates to reproduction of a multi-session disc.

2. Background Art

A compact disc (CD) was formerly the media in which the user could not write data. At the present, write-enable media are developed, such as compact disc recordable (CD-R) or compact disc rewritable (CD-RW). Such media can be manufactured and reproduced by disc recording and reproducing apparatus for the media.

Figure 5:
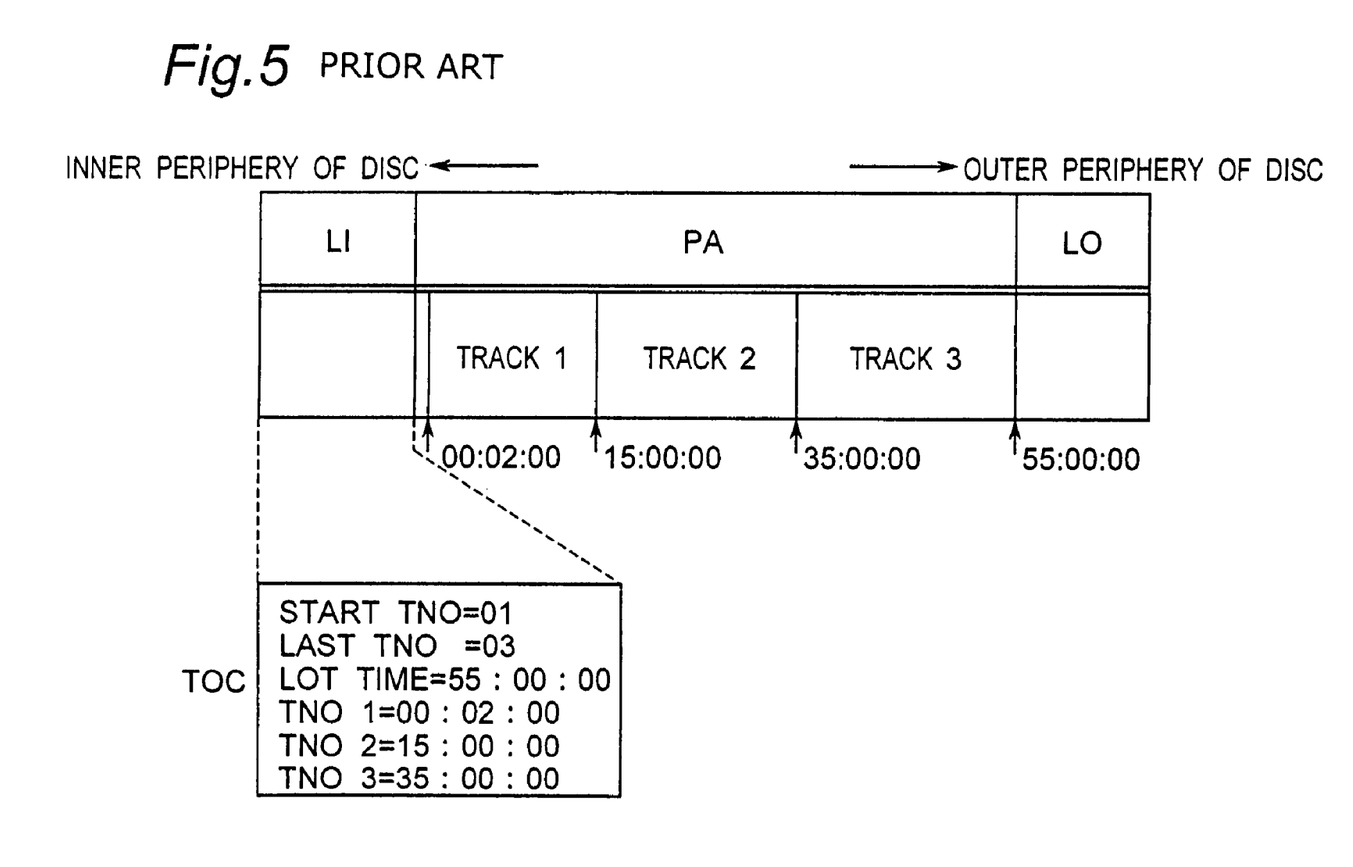
FIG. 5 is a diagram showing a data layout example of a disc recorded in a single session.
Figure 6:
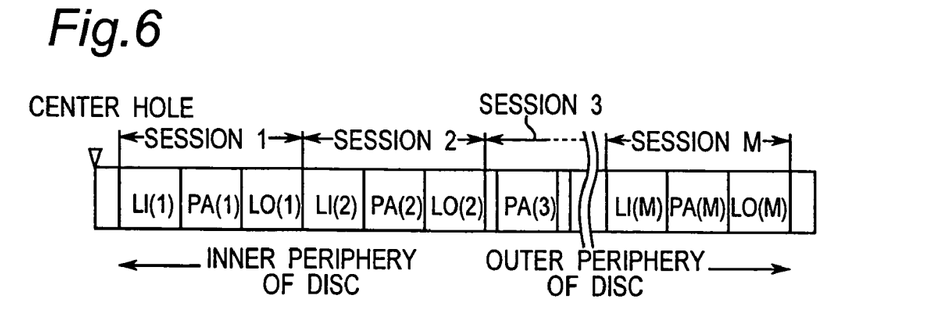
FIG. 6 is a diagram showing a data layout example of a disc recorded in multiple sessions.

A disc recording and reproducing apparatus can manufacture CD-R and CD-RW not only as ordinary single-session CD but also as multi-session CD. A "session" is a recording unit formed on a disc. FIG. 5 shows a data layout example of a disc recorded in a single session. The single-session disc is composed of one lead-in LI, a program area PA, and a lead-out LO. As index information, table-of-contents information (hereinafter referred to as TOC information) is recorded in lead-in LI. A conventional CD and compact disc read-only memory (CD-ROM) are single-session CDs. A multi-session CD is a CD composed of plural sessions manufactured by once recording partially on a CD-R or CD-RW, and adding sessions after the recorded portions. FIG. 6 shows a data layout example of a disc recorded in multiple sessions. The multi-session disc shown in FIG. 6 includes a plurality of sessions (M pieces (k=1 to M)) composed of lead-in LI (k), program area PA (k), and lead-out LO (k). In each lead-in, contents information is recorded as TOC information. The TOC information in each lead-in area LI of multi-session CD includes, aside from the position information of the own session, start time information of program area PA of next session. This is different from the TOC information of single-session CD.

In a multi-session CD, data and audio (CD-DA) can be recorded in each session. These sessions are called data session and audio session. In a multi-session CD, data sessions and audio sessions can be mixed and recorded in a same disc.

Figure 7:
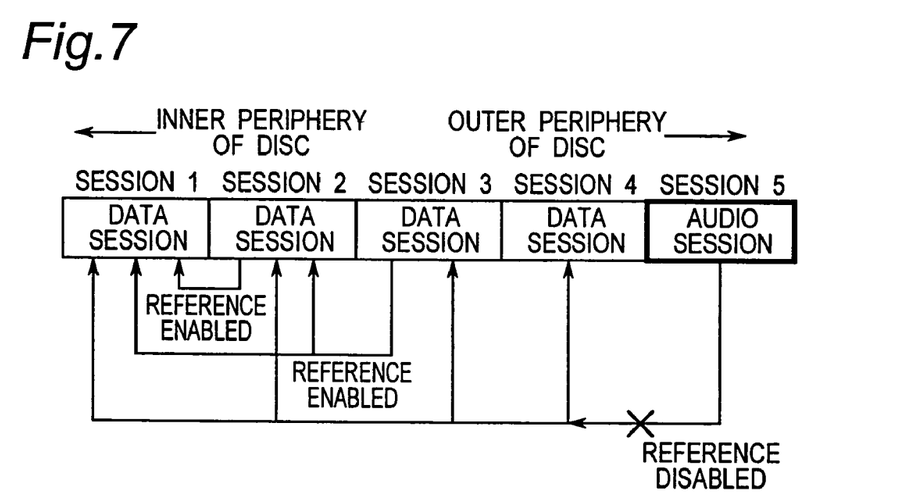
FIG. 7 is a diagram showing an example of composition of a multi-session disc including an audio session in the final place.
Figure 8:
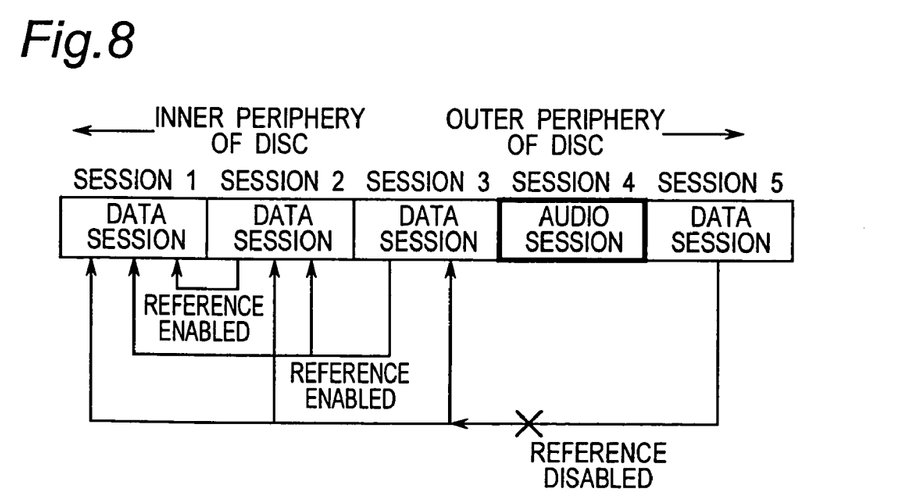
FIG. 8 is a diagram showing an example of composition of a multi-session disc including an intermediate audio session.

FIG. 7 shows an example of composition of multi-session CD including an audio session in the last place. On the other hand, FIG. 8 shows an example of composition of multi-session disc including an intermediate audio session. Generally, a multi-session CD is manufactured in a procedure comprising the steps of recording one or plural tracks in program area PA of each session, recording an ISO 9660 file system, and recording track information of corresponding session and start timer information of program area of next session in lead-in area LI of the same session. In this process, if additional writing is not allowed in the disc, start time information of program area of next session is not recorded in lead-in area LI.

When recording computer-readable data on a disc, generally, an ISO 9660 file system is used. What is recorded by using this system is a data session. The ISO 9660 file system manages the data in the file unit, and builds up a hierarchical structure by using a directory. In a multi-session CD composed of plural data sessions, the ISO 9660 file system information described in the data session at the inner peripheral side can be added to the ISO 9660 file system information of next data session. Accordingly, by analyzing the ISO 9660 file system of the final session of the multi-session CD, it is allowed to access all files in the multi-session CD. For example, in the multi-session CD shown in FIG. 6, if all of session 1 to session M are data sessions, by analyzing the ISO 9660 file system of the final session M, it is possible to access all files in the multi-session CD.

However, as shown in FIG. 7 or FIG. 8, when audio sessions are recorded on a same disc, the ISO 9660 file system information described in the data sessions at the inner peripheral side thereof cannot be added to the ISO 9660 file system information of next audio session. Therefore, if the ISO 9660 file system of the final session of the multi-session CD is analyzed, all files in the multi-session CD cannot be accessed. In the examples in FIG. 7 and FIG. 8, it is impossible to refer to the sessions before the final session (session 5).

Figure 9:
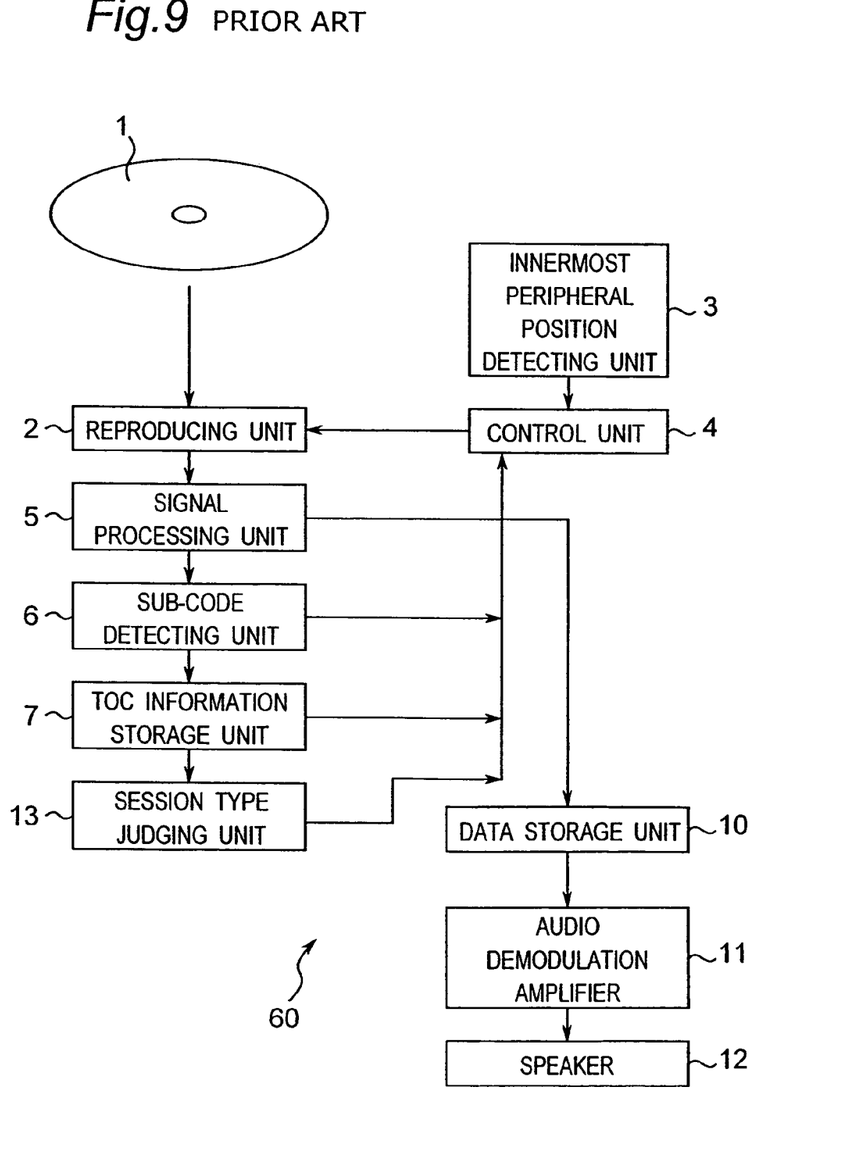
FIG. 9 is a block diagram of a conventional disc reproducing apparatus.

Next, operation of conventional disc reproducing apparatus is explained. FIG. 9 is a block diagram showing a configuration of a conventional disc reproducing apparatus 60. A reproducing unit 2 for reproducing data from a disc can be loaded with a disc 1 to be reproduced, and comprises mechanical units such as a pickup for reproducing data from the loaded disc 1. Reproducing unit 2 detects start position information of program area from the lead-in area at the innermost peripheral side, and transfers the optical pickup to this position, and detects a signal from the program area. A signal processing unit 5 demodulates (decodes) the data from reproducing unit 2 from data format of recording format. A data storage unit 10 temporarily stores the demodulated reproduction data. A control unit 4 controls the general operation of the disc reproducing apparatus. For this purpose, control unit 4 incorporates a program for controlling a general operation of the disc reproducing apparatus. Control unit 4 controls to store the reproduction data outputted from signal processing unit 5 temporarily in data storage unit 10.

Generally, when reproducing a multi-session CD by conventional disc reproducing apparatus 60, first of all, disc reproducing apparatus 60 sequentially inspects the lead-in area of the multi-session CD, recognizes the final session, and starts operation for reproduction. More specifically, the procedure is as follows. That is, when a multi-session CD (FIG. 6) is inserted into disc reproducing apparatus 60, control unit 4 positions an optical pickup (not shown) in lead-in area LI (1) of first session of the disc innermost peripheral portion, and recognizes the start address of program area PA (2) of second session. In succession, the pickup is moved to program area PA (2) of second session, and it is inspected if data is recorded or not. At this time, when data is read out from program area PA (2), the pickup is moved again in the direction of inner periphery of CD to read the start address of program area PA (3) of next third session from the position of lead-in LI (2) of second session. Further, the pickup is moved to program area PA (3), and it is inspected again to see if data is recorded or not. In this manner, disc reproducing apparatus 60 inspects the state of each session while repeating up to the final session of session M.

In this period of repeated inspection, when it is known that next session start time information is not recorded in lead-in area LI (k) of session k, or that data is not recorded in program area PA (k+1) of session k+1, at this moment, disc reproducing apparatus 60 judges that session k is the final session, and moves the pickup to a region or area before session k having recorded data, and starts analysis of ISO 9660 file system.

In succession, the procedure of reproducing music data on disc is as follows. Control unit 4 demodulates data signal from data storage unit 10 into analog music signal in an audio demodulation amplifier 11, and outputted as a sufficiently large electrical signal from a speaker 12. For controlling general operation of the disc reproducing apparatus, control unit 4 once reads out the TOC information in the lead-in area at the inner peripheral side of disc 1 through a signal processing unit 5 and a sub-code detecting unit 6, and stores in a TOC information storage unit 7. By first reading the TOC information and displaying the track information on disc 1 in a display unit, disc reproducing apparatus 60 urges the user to select a desired tune to be performed. When the user selects tune, control unit 4 fetches start address information of the track to be reproduced from within the program area, and moves the optical pickup to this position, and reads out the music data signal. Control unit 4 operates in this way according to the specified program.

Figure 10A:
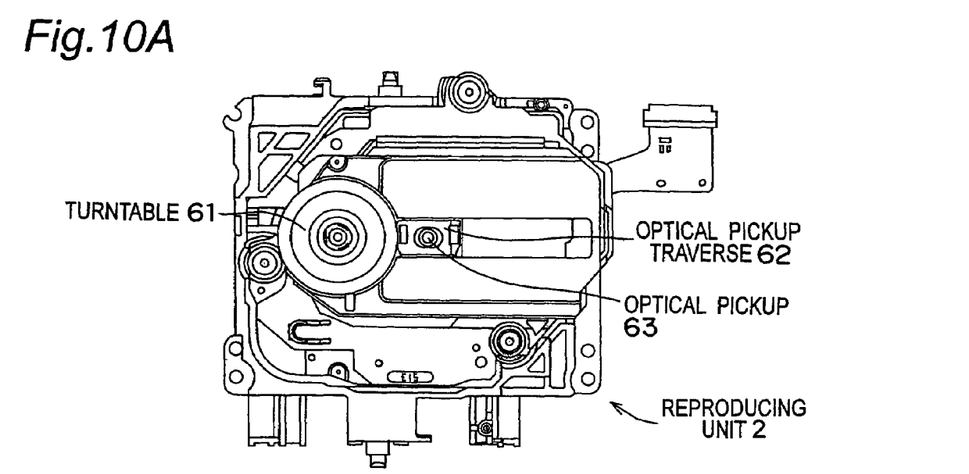
FIG. 10A to FIG. 10C are diagrams showing a configuration of an inexpensive mechanism.
Figure 10B:
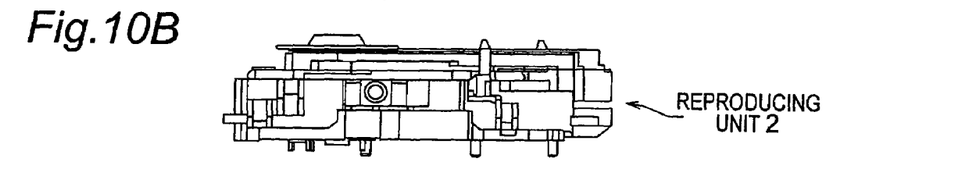
Figure 10C:
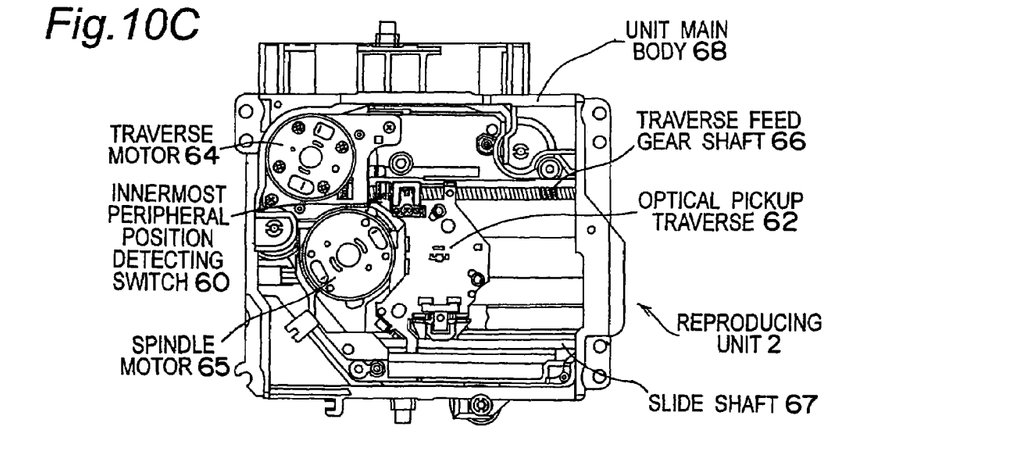

Therefore, when a disc is loaded into disc reproducing apparatus 60, disc reproducing apparatus 60 moves the pickup to lead-in area LI in order to read in the TOC information. For this operation, it is required that the present pickup position should be recognized. The pickup position can be recognized, for example, by making use of the detection voltage of the potentiometer changing depending on the pickup position. More specifically, by driving a stepping motor, linear motor or the like depending on the detection voltage of the potentiometer, the optical pickup can be moved at high precision. However, the potentiometer and linear motor are expensive and elevate the cost. Instead of the position sensor such as potentiometer, therefore, it is known to use an inexpensive push switch for detecting position which is turned on only when the optical pickup is positioned nearly on the innermost periphery. FIG. 10A to FIG. 10C show a configuration of an inexpensive mechanism employing this technique.

Figure 11:
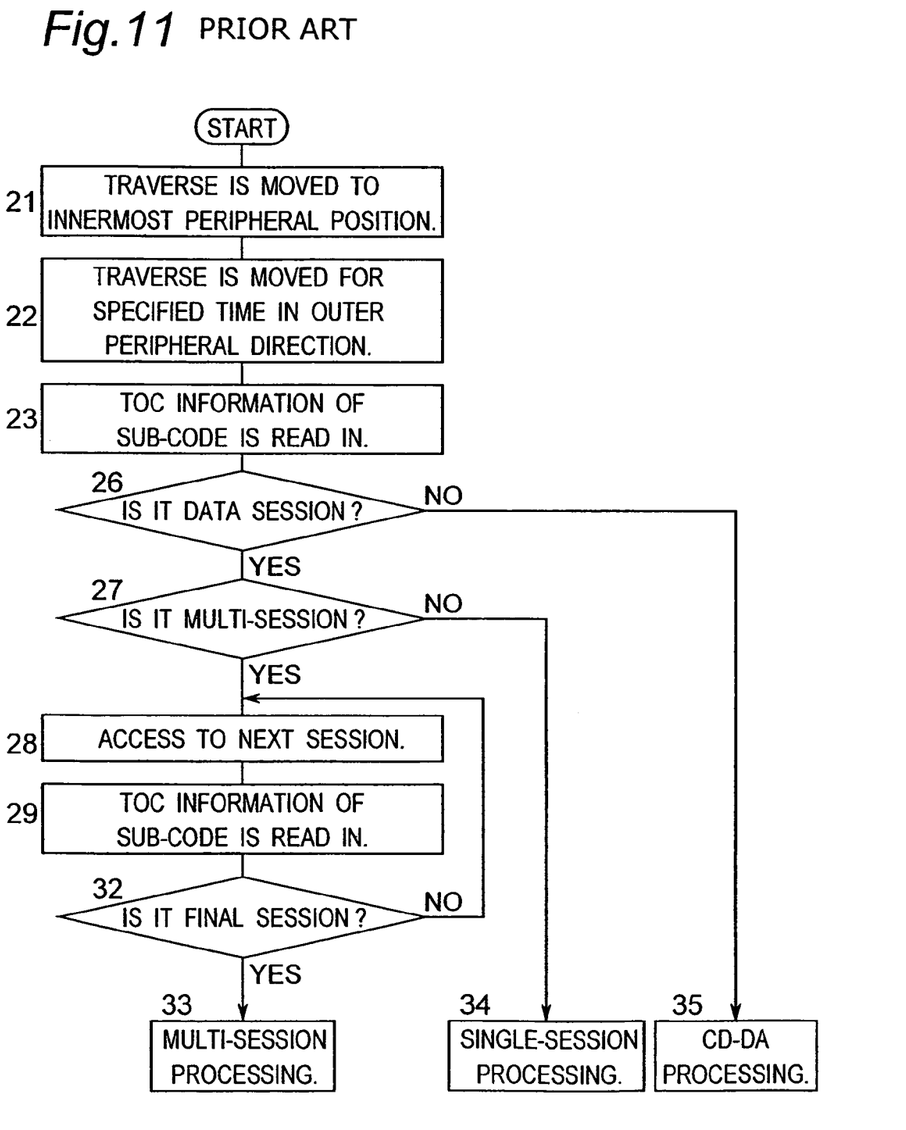
FIG. 11 is a flowchart of reproduction of data of multi-session CD by a disc reproducing apparatus.

Referring to FIG. 11, the following is the explanation of reproducing a multi-session CD (FIG. 6) recording only data session loaded in disc reproducing apparatus 60 (FIG. 9). FIG. 11 is a flowchart of reproduction of multi-session CD data by disc reproducing apparatus 60. In the mechanism of disc reproducing apparatus 60 (FIG. 9), when a multi-session CD is loaded, control unit 4 (FIG. 9) cannot always recognize the position of the optical pickup. Accordingly, control unit 4 first moves the traverse incorporating the optical pickup in the inner peripheral direction in order to position the optical pickup nearly on the innermost periphery of disc 1 (step 21). When the optical pickup comes nearly to the innermost periphery of the disc, the traverse is moved in the outer peripheral direction for a specific time, and is stopped (step 22). When the optical pickup accesses the first lead-in LI (1), by reading the sub-code, the TOC information is read in (step 23), and this session is judged to be data session or not (step 26). If it is not data session (NO at step 26), it is judged to be an audio session, and CD-DA signal is processed (step 35). In the case of data session (YES at step 26), on the other hand, it is judged to be a multi-session or not depending on whether program area start position information of next session is present or not in the TOC information (step 27).

If there is no program area start position information of next session in the TOC information, and it is judged not to be a multi-session disc (NO at step 27), it is included to be a single-session disc, and the process corresponding to the single-session is executed (step 34). On the other hand, if there is program area start position information of next session in the TOC information, it is judged to be a multi-session disc (YES at step 27), and accessed the next session (step 28). The TOC information of sub-code of next session is read in (step 29), and it is judged if this session is the final session or not (step 32). It is judged at this step 32 by detecting that program area start address of next session is not recorded in TOC information of present session, or that next session is not actually recorded if program area start address of next session is recorded.

As a result of detection, if judged not to be final session (NO at step 32), it means that a next session is present, and the process returns to step 28, and the process at step 28, step 29, and step 32 is repeated. If judged to be final session (YES at step 32), the present session (for example, session M in FIG. 6) is regarded as final session, and the multi-session process for accessing the specified multiple sessions is executed (step 33).

In disc reproducing apparatus 60 (FIG. 9), when reproducing a multi-session disc (FIG. 7), disc reproducing apparatus 60 accesses up to session 5 in an attempt to acquire the address of next session. However, address information of next session does not exist, and hence it is attempted to analyze the file system, assuming session 5 as final session. Session 5 is an audio session, and audio data (CD-DA) is recorded, and there is no file system information about data session of session 1 to session 4. As a result, an inaccessible phenomenon occurs in the data for reproduction of session 1 to session 4.

Also in disc reproducing apparatus 60 (FIG. 9), when reproducing a multi-session disc (FIG. 8), disc reproducing apparatus 60 accesses up to session 4 in an attempt to acquire the address of next session. However, address information of next session does not exist, and hence it is attempted to analyze the file system, assuming session 4 as final session. Session 4 is an audio session, and audio data (CD-DA) is recorded, and there is no file system information about data session of session 1 to session 3. As a result, an inaccessible phenomenon occurs in the data for reproduction of session 1 to session 3.

Therefore, in the conventional disc reproducing apparatus 60, if the ISO 9660 file system of final session is analyzed, information of data session of inner side than audio session cannot be acquired, and it was impossible to access the data section of the inner side.

The conventional disc reproducing apparatus 60 (FIG. 9) involved one more problem. That is, in disc reproducing apparatus 60, when reproducing the disc recorded in multiple sessions, if the data quantity stored in the first session is small, the data not intended to be reproduced was sometimes reproduced by mistake. The reason is that, owing to the small capacity of data stored in the first session, the access for reading the TOC information of the first session has surpassed the recorded portion of the first session to get into lead-in of next session 2. As a result, the TOC information of other session is read and stored. A radical reason of such malfunction is that most commercial music audio CDs are recorded in single session, not in multiple sessions, and hence disc reproducing apparatus 60 is designed to reproduce single-session discs only.

Figure 12:
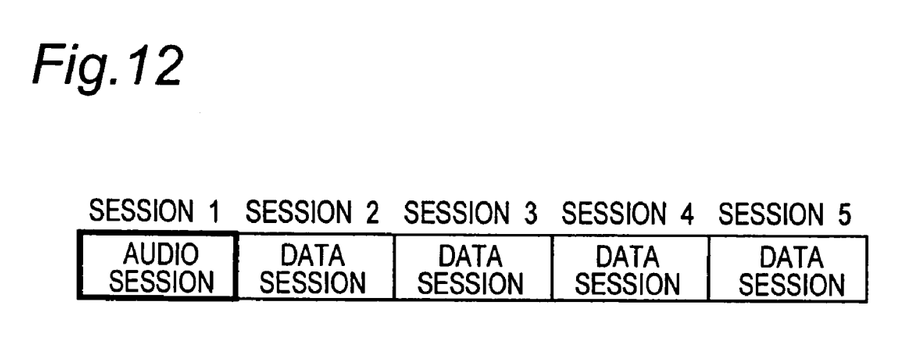
FIG. 12 is a diagram showing data composition of multi-session disc including an audio session.
Figure 13:
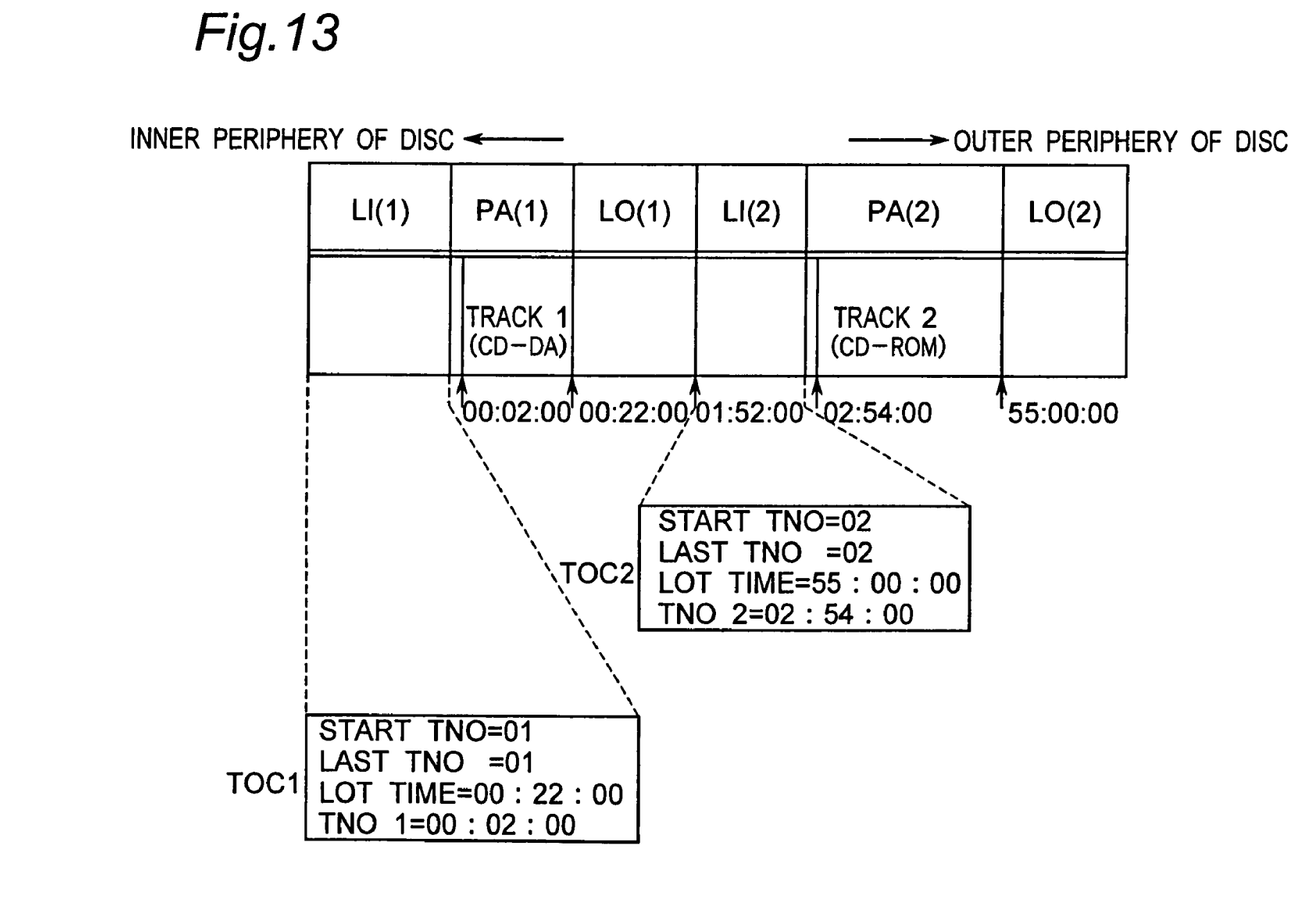
FIG. 13 is a diagram showing a detailed data composition of left end portion of FIG. 12.

It is more specifically described. FIG. 12 is a diagram showing data composition of multi-session disc including audio sessions. FIG. 13 is a diagram showing a detailed data composition of left end portion of FIG. 12 (the portion of session 1 and session 2). As shown in FIG. 13, in session 1 of this disc, a very short audio session of 20 seconds is recorded. When this disc is reproduced by the conventional disc reproducing apparatus 60 (FIG. 9), at step 22 (FIG. 11), surpassing session 1 (audio session), it gets into lead-in L1 (2) of session 2. When the TOC information is read at step 23 (FIG. 11), only the portion after session 2 is recognized, and the CD-DA process (step 35) of session 1 to be executed may not be executed.

SUMMARY OF THE INVENTION

An object of the present invention is to access by recognizing the data session correctly in a multi-session disc including both audio session and data session, and to judge the lead-in area of first session to reproduce the intended data correctly.

The reproducing apparatus of the present invention is a reproducing apparatus of a multi-session disc mixing a session of first type recording first data and a session of second type recording second data different from the first data, which comprises an optical pickup for accessing the session of first type and the session of second type, a judging unit for judging the type of the session accessed by the optical pickup, and a limiting unit for limiting the session of first type to a reproducible session when the session of second type judged by the judging unit is present at an access position after the session of first type.

According to the present invention, when reproducing a multi-session CD recording a data session from the inner periphery of a disc to the direction of outer periphery, and recording an audio session in the direction of outer periphery of the disc in succession to the data session, the data section up to the audio session is set as effective accessible session, and access to the audio session is limited, and the data session of the inner periphery side than the audio session can be reproduced securely.

Further according to the present invention, if the data stored in the first session of the multi-session disc is an extremely small capacity, when reading in the TOC information of a disc, if the optical pickup surpasses the recorded data portion of the first session and gets into lead-in of other session, the access can be corrected to the lead-in of the first session by judging if it is the lead-in of the first session or not. Therefore, if the recorded data in the first session of the multi-session disc to be reproduced is extremely small in capacity, the TOC information necessary for reproduction can be read in correctly. Since the TOC information can be read in correctly, problems of access failure do not occur even in the case of reproduction of multi-session disc by using inexpensive position detecting push switch or brush type DC motor without speed control mechanism, so that an inexpensive reproducing apparatus can be realized.

The limiting unit may also limit only the session of first type as a reproducible session by setting the session of first type existing immediately before the session of second type as the final session.

The first data is data to be used by a computer, and the second data may be audio data (CD-DA).

The first data is audio data (CD-DA), and the second data may be data to be used by a computer.

The session of first type and the session of second type may be each composed of a lead-in area recording index information including information of reproduction start time measured from a disc innermost peripheral position, program area recording program tracks storing data to be reproduced, and lead-out area, corresponding to the start position of each program track, and the apparatus may further comprise a session judging unit for judging if the lead-in area of a specified session is the lead-in area of a first session of the multi-session disc on the basis of the information of the reproduction start time included in the index information being read out by the optical pickup.

The session judging unit may judge the lead-in area of the specified session to be the lead-in area of the first session when the reproduction start time of the first program track of the specified session is smaller than a specified value.

The session judging unit may also judge the lead-in area of the specified session not to be the lead-in area of the first session when the reproduction start time of the first program track of the specified session is larger than a specified value.

The apparatus may further comprise an access retry unit for allowing the optical pickup to access other session positioned at inner periphery of the disc when the session judging unit judges the lead-in area of the specified session not to be the lead-in area of the first session.

On the basis of the access result by the access retry unit, the session judging unit may further judge if the lead-in area of other session is the lead-in area of the first session of the multi-session disc or not.

BRIEF DESCRIPTION OF THE DRAWINGS

Referring now to the accompanying drawings, an embodiment of the present invention is described in detail below.

DESCRIPTION OF THE PREFERRED EMBODIMENTS

Referring now to the accompanying drawings, an embodiment of the present invention is described in detail below. In the drawings, constituent elements having same functions are identified with same reference numerals.

Figure 1:
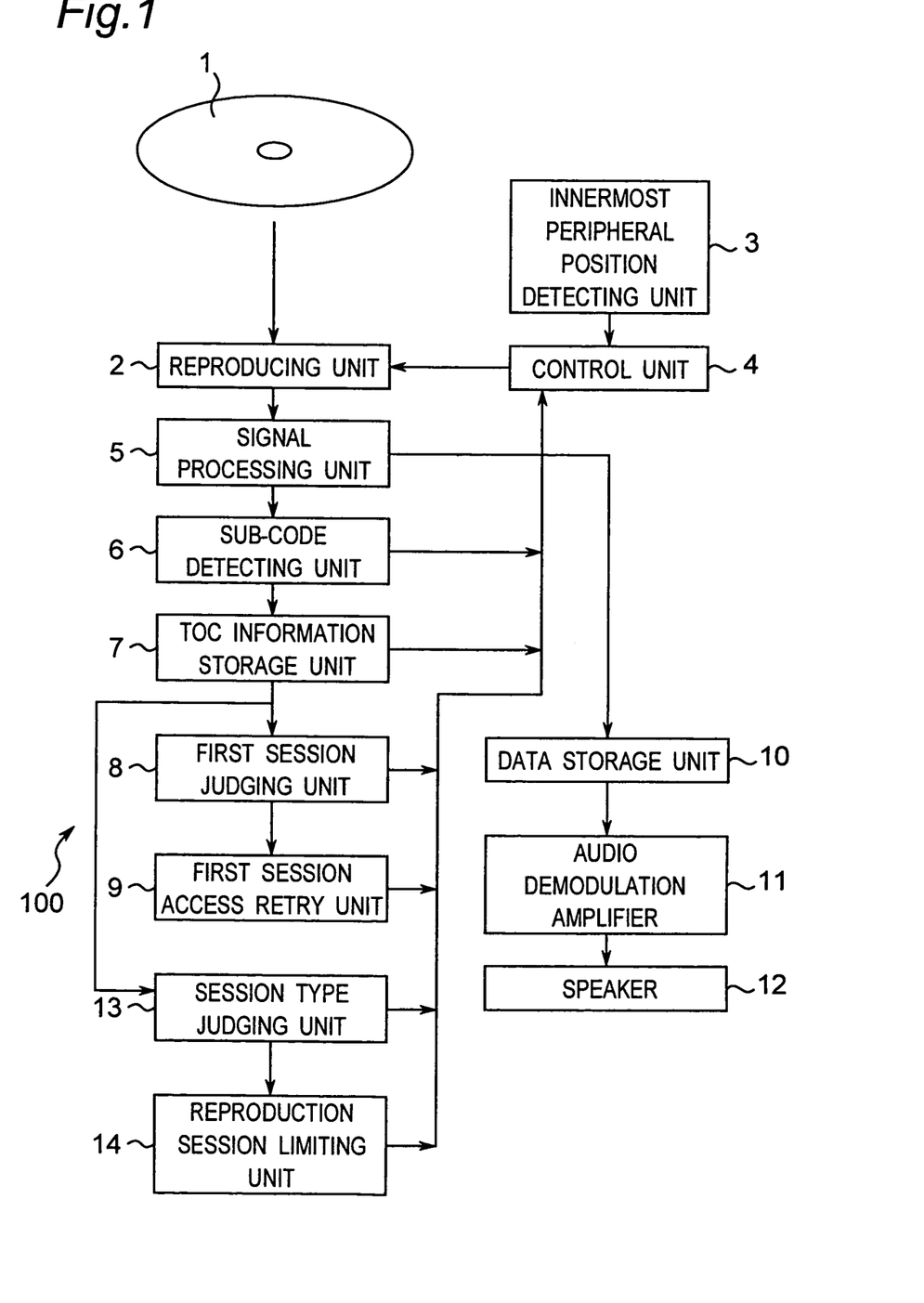
FIG. 1 is a block diagram of a disc reproducing apparatus of the present invention.

FIG. 1 is a block diagram of a disc reproducing apparatus 100 in an embodiment of the present invention. Disc reproducing apparatus 100 reproduces data recorded in a loaded disc 1. Disc 1 is a multi-session disc having plural sessions. The "session" is a recording unit composed of three recording areas, that is, a lead-in area, a program area, and a lead-out area. The program area of each session stores program tracks containing contents data (for example, audio data, video data, and/or data used in computer). Data used in computer includes CD-ROM data such as MP3 format compressing audio signals.

The lead-in area stores table-of-contents information (hereinafter referred to as TOC information) as index information for specifying the start position of the data (program track) recorded in the program area. The data start position is specified by the information of reproduction time in the case of ordinary reproduction from the disc innermost periphery or from a certain reference point. In disc 1, on the other hand, sub-code information capable of specifying the reproduction time when reproducing from the disc innermost periphery is recorded regularly. Disc reproducing apparatus 100 can specify the position corresponding to the reproduction start time from the disc innermost periphery indicated by the TOC information by using the sub-code information, and thereby can access a desired position. In this specification, the term "time" refers to the reproduction start time when it is measured from the innermost periphery of the disc or from the reference point. The sub-code information may include, not only the time, but also additional information such as the type of session (audio session or data session), tune number, index, time, and text. In this specification, in particular, the sub-code information capable of identifying the time and type of session is utilized.

Disc reproducing apparatus 100 comprises a reproducing unit 2, an innermost peripheral position detecting unit 3, a control unit 4, a signal processing unit 5, a sub-code detecting unit 6, a TOC information storage unit 7, a first session judging unit 8, a first session access retry unit 9, a data storage unit 10, an audio demodulation amplifier 11, a speaker 12, a session type judging unit 13, and a reproduction session limiting unit 14.

The constituent elements of disc reproducing apparatus 100 are explained below. Reproducing unit 2 is loaded with a disc 1 to be reproduced, and comprises mechanical units such as a pickup for reproducing the data of the loaded disc 1. In this embodiment, reproducing unit 2 is realized by a mechanism (inexpensive mechanism) shown in FIG. 10A to FIG. 10C. FIG. 10A to FIG. 10C show a configuration of the inexpensive mechanism. The inexpensive mechanism includes an inexpensive push switch for detecting position (an innermost peripheral position detecting switch 60) which is turned on only when an optical pickup traverse 62 is located nearly in the innermost peripheral area of disc 1. Innermost peripheral position detecting switch 60 is connected to control unit 4 (FIG. 1) as innermost peripheral position detecting unit 3 (FIG. 1). In this inexpensive mechanism, instead of the expensive linear motor, a brush type DC motor without speed control mechanism of same type as used in a cheap plastic model is used as a traverse motor 64.

Disc 1 is put on a turntable 61, and is driven by a spindle motor 65 shown in FIG. 10C. An optical pickup 63 is incorporated in optical pickup traverse 62. That is, when optical pickup traverse 62 is moved, optical pickup 63 is also moved. When traverse motor 64 rotates, a traverse feed gear shaft 66 rotates, and optical pickup traverse 62 is guided by a slide shaft 67, and moves in a very tight state.

By such basic operation, reproducing unit 2 (FIG. 1) generates a reproduction signal by reproducing the data of the loaded disc 1. Herein, "reproduction" does not mean recomposition of data into a state to be directly appreciated by the user, but it means to fetch data recorded in disc 1 on the basis of the pit information or the like of disc 1. Innermost peripheral position detecting unit 3 detects the innermost peripheral position of disc 1, and sends the result of detection to control unit 4.

Signal processing unit 5 demodulates the reproduction signal from reproducing unit 2 as digital reproduction data signal. The demodulated data signal is temporarily stored in data storage unit 10. When the reproduction data signal is a music data signal, audio demodulation amplifier 11 decodes the digital reproduction signal from reproducing unit 2 into an analog music signal, and amplifies the analog music signal into a sufficiently large electrical signal. Speaker 12 delivers the amplified the analog music signal as a sound. When the reproduction data signal is other than music data signal, image or the like is displayed according to the signal, or sent into a memory of computer or the like as data to be used in a computer.

Control unit 4 control general operation of disc reproducing apparatus 100. Explaining the operation in access time, control unit 4 reads out TOC information through signal processing unit 5 and sub-code detecting unit 6, and stores in TOC information storage unit 7 (so-called random access memory (RAM)). Using the stored TOC information, control unit 4 fetches time information showing the time of the track to be reproduced. To access the data of the time indicated by the time information, the sub-code information recorded in disc 1 is utilized. Specifically, control unit 4 reads the sub-code information at the present position of optical pickup 63 (FIG. 10A), and compares time ta indicated by the sub-code information with time tb indicated by the time information. If time ta<time tb, control unit 4 moves optical pickup 63 to outer side. If time ta>time tb, control unit 4 moves optical pickup 63 to inner side. By repeating this operation, when reaching the state of time ta=time tb, this position is the reproduction start position. Control unit 4 reads out the data at this position. These operations are executed according to the process of the program stored in control unit 4. Operation of control unit 4 is realized by using so-called microcomputer.

First session judging unit 8 judges whether the lead-in area reached by access operation is the lead-in area of the beginning session (first session) of the disc or not. Specifically, depending on whether the reproduction start time of the first program track in that session indicated by the TOC information in the lead-in area reached by the access operation is within a specified value or not, it is judged whether the pertinent lead-in area is the lead-in area of the beginning session (first session) of the disc or not. The "specified value" means 1 minute in this specification. When first session judging unit 8 judges that this area is not the lead-in area of the first session, first session access retry unit 9 moves the optical pickup again to the innermost peripheral position of the disc. The subsequent moving time of the optical pickup in the direction of the outer periphery is changed to a shorter time than the moving time of the first access operation, and the optical pickup is moved again, aiming at the first session, and the access operation is repeated. On the other hand, when first session judging unit 8 judges that this area is the lead-in area of the first session, control unit 4 causes the optical pickup to continue the access to the same area to read out data.

Session type judging unit 13 judges whether the session is an audio session or a data session depending on the content of the sub-code information of the accesses session. Reproduction session limit unit 14 limits the session to be reproduced in the disc, if required, depending on the output of session type judging unit 13.

Operation of disc reproducing apparatus 100 (FIG. 1) is explained. Disc reproducing apparatus 100 (FIG. 1) reproduces a multi-session disc 1 having a session composition as shown in FIG. 6.

Figure 2:
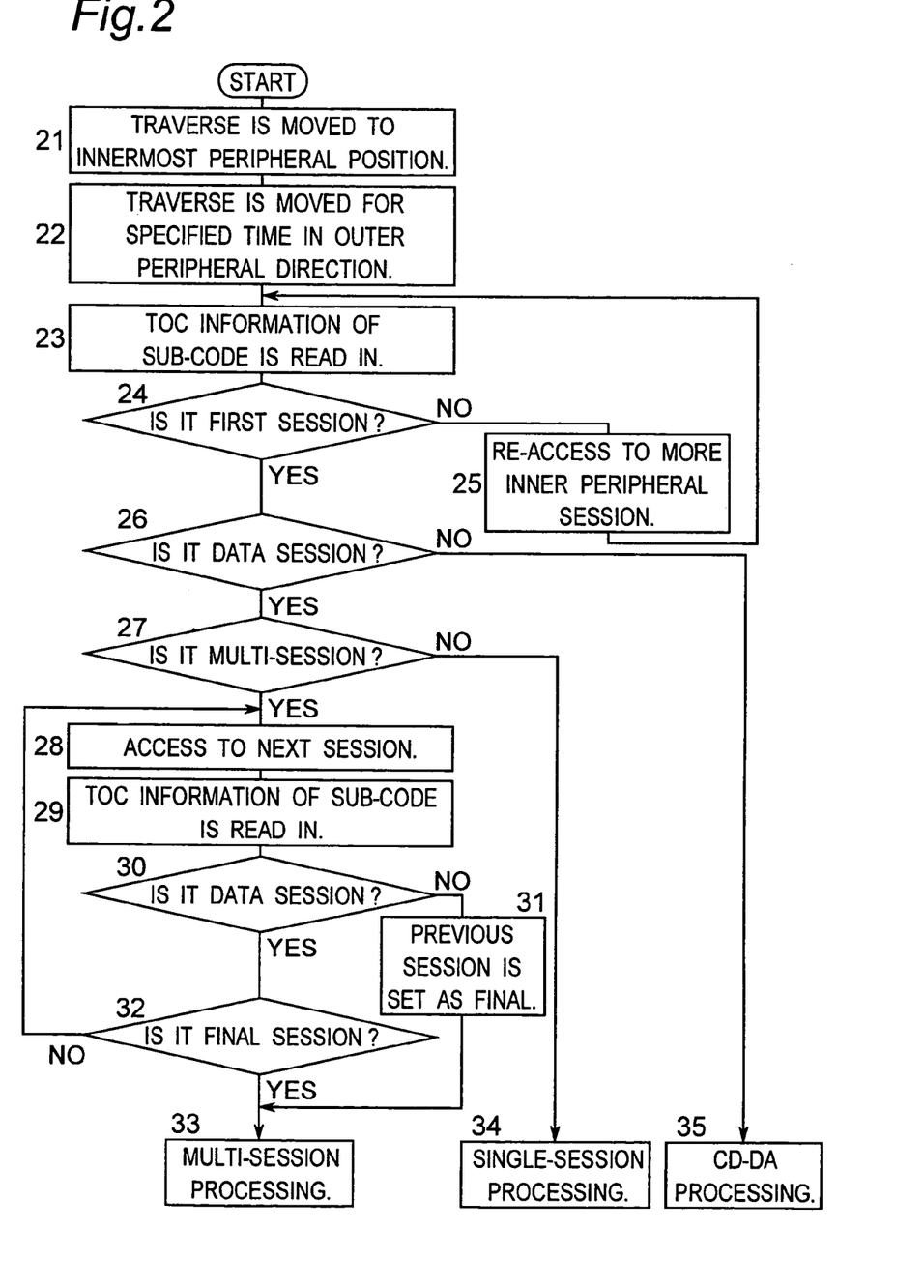
FIG. 2 is a flowchart showing session judging operation of disc reproducing apparatus.

By sequentially inspecting lead-in areas of a CD, the operation for identifying a final session is explained. FIG. 2 is a flowchart showing a session judging operation of disc reproducing apparatus 100. When multi-session CD is loaded in reproducing unit 2 (FIG. 1), control unit 4 (FIG. 1) first moves the traverse incorporating the optical pickup in the direction of inner periphery in order to position the optical pickup nearly on the innermost periphery of disc 1 (step 21). This is because, in the inexpensive mechanism (FIG. 10A to FIG. 10C) provided in disc reproducing apparatus 100, the position of the optical pickup cannot be always recognized, and it is required to move first nearly to the innermost periphery of disc 1. When the optical pickup comes nearly to the innermost periphery of the disc, the traverse is moved for a specific time in the direction of outer periphery and is stopped (step 22). First session judging unit 8 reads out the TOC information by reading out sub-code by way of signal processing unit 5 and sub-code detecting unit 6. It is judged whether the presently accessed session is first session, that is, session 1 (FIG. 6) or not (step 24).

When first session judging unit 8 judges not to be first session (NO at step 24), first session access retry unit 9 accesses again a further inner periphery session (step 25), and repeats step 23 and step 24. On the other hand, when first session judging unit 8 judges to be first session (YES at step 24), session type judging unit 13 judges whether the session is data session or not (step 26). If not judged to be data session (NO at step 26), session type judging unit 13 judges that the present session is an audio session, and executes CD-DA signal processing (step 35). If judged to be data session (YES at step 26), session type judging unit 13 judges whether this disc is a multi-session disc or not, depending on whether program area start information position of next session is present or not in the TOC information (step 27).

As a result of judgement, if there is no program area start information position of next session in the TOC information, and it is judged not to be multi-session disc (NO at step 27), it is judged to be a single-session disc, and the processing corresponding to the single-session disc is carried out (step 34). On the other hand, if there is program area start information position of next session in the TOC information, it is judged to be multi-session disc (YES at step 27), and a next session is accessed (step 28). By reading in the TOC information of sub-code of next session (step 29), it is judged whether the presently accessed session is data session or not (step 30).

As a result of judgement, if the presently accessed session is not data session (NO at step 30), the session is an audio session, and reproduction session limiting unit 14 (FIG. 1) sets the session before the present session as the final session (step 31). Meaning of such setting is to limit the session to be reproduced by disc reproducing apparatus 100 (FIG. 1) to the area before the present session. As a result, access to the audio session is prohibited, and only the data session of the disc can be reproduced appropriately. After the setting is completed, control unit 4 (FIG. 1) executes multi-session processing (step 33).

On the other hand, when the presently accessed session is data session (YES at step 30), it means the present session is also data session. It is judged whether this session is the final session or not (step 32). This is judged by detecting that program area start address of next session is not recorded in the TOC information of the present session, or by detecting that next session is not actually recorded if program area start address of next session is recorded. If not the final session (NO at step 32), it assumes that a next session will exist, and the process of step 28, step 29, step 30, and step 32 is repeated until reaching the final session. When judged to be the final session (YES at step 32), control unit 4 (FIG. 1) executes multi-session process, handling the present session (for example, session M in FIG. 6) as the final session (step 33).

As multi-session processing, for example, the following specification may be considered. That is, from the files recorded in all sessions, the information of number of tunes that can be reproduced by this disc reproducing apparatus (for example, MP3 type files) is investigated, and part of important information is shown in a display unit (not shown) telling, for example, that a total of 100 tunes are recorded in this disc and that it takes 255 minutes and 30 seconds to reproduce them all. When the user manipulates to start reproduction by pressing, for example, PLAY key (not shown), the start position of designated tune file is investigated by referring to the file system information of the final session (session M), and reproduction is started by accessing this position.

Specifically, as a multi-session disc, a case which reproduces a multi-session disc having session composition as shown in FIG. 7 is explained. Session type judging unit 13 (FIG. 1) of disc reproducing apparatus 100 recognizes first data session 1, and then sequentially recognizes up to data session 4. When session 5 is recognized to be an audio session, reproduction session limiting unit 14 (FIG. 1) sets session 4 as final session. As a result, access to audio session 5 is limited, and multi-session process is executed only in data sessions 1 to 4. That is, file access and reproduction are enabled in a range of data sessions 1 to 4. Not accessing the audio session (session 5) lacking the file system information relating to the data sessions of sessions 1 to 4, the file system information of data sessions 1 to 4 can be acquired on the basis of the TOC information of data session 4 as the final session, so that the data recorded in these sessions can be securely accessed.

Or, as a multi-session disc, explaining a case which reproduces a multi-session disc having session composition as shown in FIG. 8, when session type judging unit 13 recognizes session 4 to be an audio session, reproduction session limiting unit 14 sets session 3 as final session. As a result, file access and reproduction are enabled in a range of data sessions 1 to 3.

In the foregoing explanation, relating to the access position when accessing from the disc inner periphery, data session is present ahead of an audio session. This is only an example, and the same principle is applied if data session and audio session are exchanged. Specifically, relating to the access position when accessing from the disc inner periphery, if an audio session is present ahead of a data session, only the first audio session may be set as a reproducible session.

When the recorded data in the first session is a small capacity, reproduction of multi-session disc is explained below. FIG. 12 is a diagram showing data composition of multi-session disc including an audio session. FIG. 13 is a diagram showing a detailed data composition of left end portion of FIG. 12. As shown in FIG. 13, a very short (20 seconds) audio session is recorded in session 1 of this disc.

Figure 3:
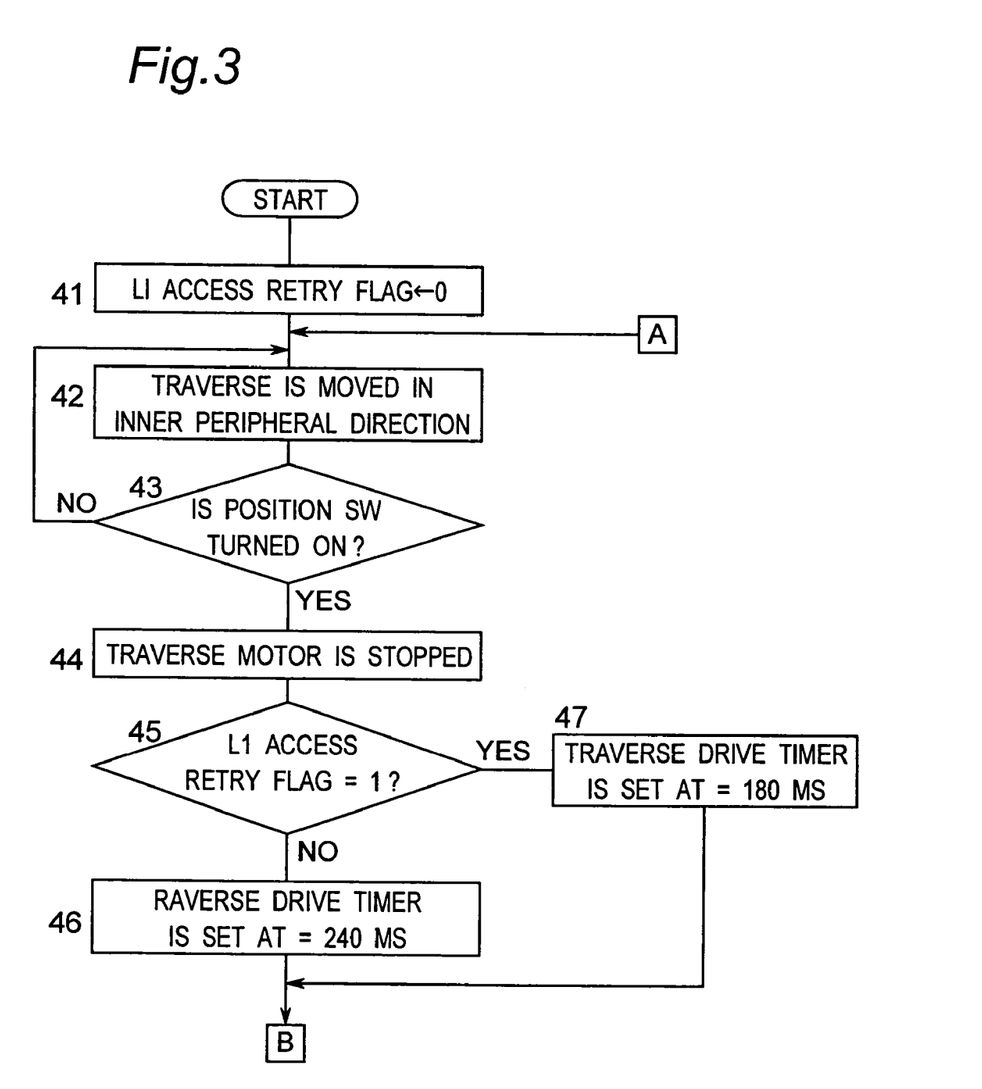
FIG. 3 is a flowchart showing access operation of disc reproducing apparatus.
Figure 4:
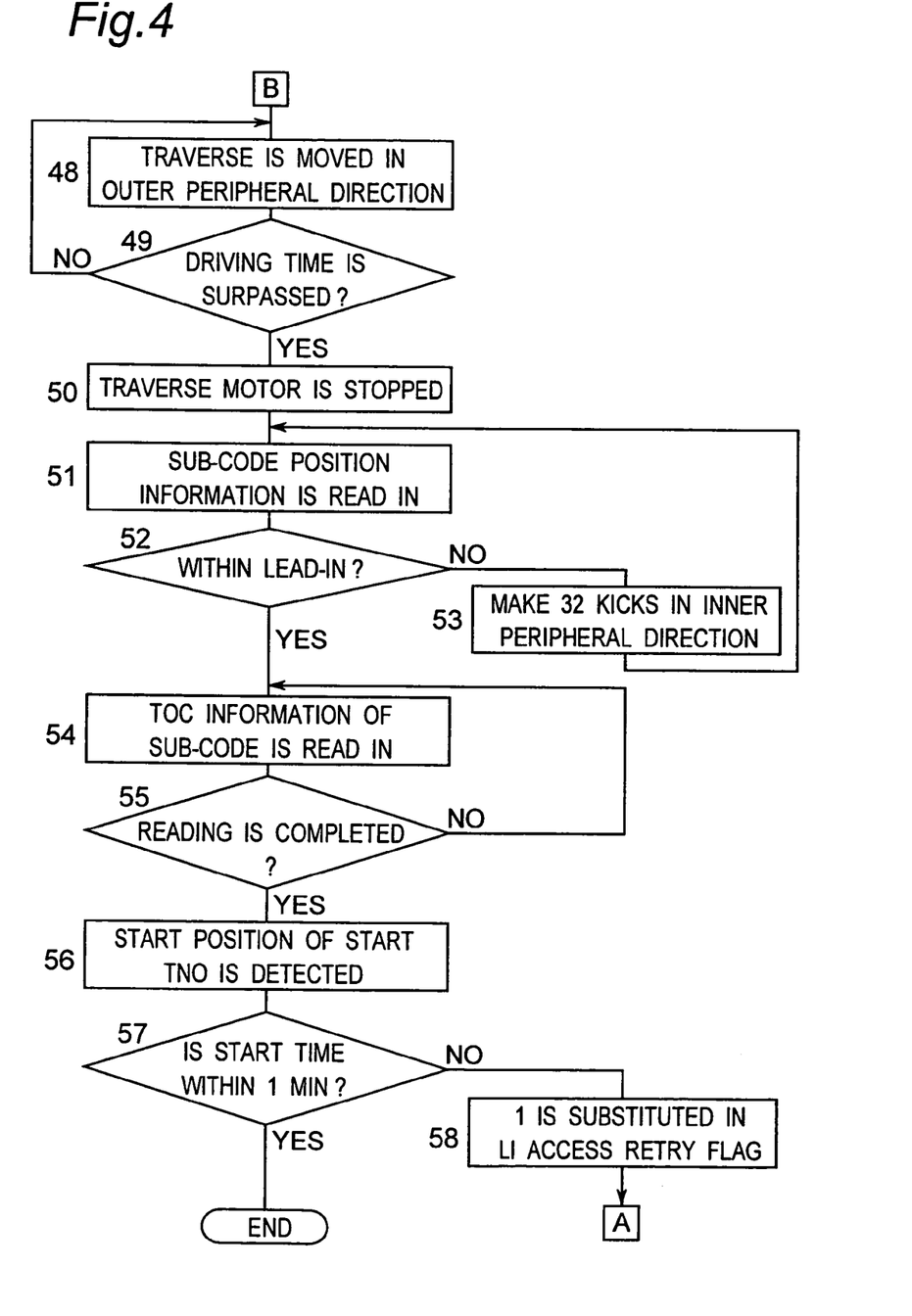
FIG. 4 is a flowchart showing access operation of disc reproducing apparatus.

FIG. 3 and FIG. 4 are flowcharts showing access operation of disc reproducing apparatus 100 (FIG. 1). Referring to FIG. 3, when disc 1 is loaded, LI access retry flag is cleared to 0 as first data initialization operation (step 41). Detail of LI access retry flag is explained later.

When disc 1 is loaded, in the inexpensive mechanism shown in FIG. 10A to FIG. 10C, the position of optical pickup 63 cannot be always recognized. Accordingly, control unit 4 (FIG. 1) first drives traverse motor 64 of the inexpensive mechanism, and moves optical pickup traverse 62 in the direction of inner periphery (step 42). As a result, optical pickup traverse 62 (FIG. 2) is positioned nearly on the innermost periphery of disc 1. When optical pickup 63 (FIG. 2) nearly comes to the inner periphery of disc, innermost peripheral position detecting switch 60 is turned on, and it is detected (step 43). As a result, control unit 4 (FIG. 6) stops traverse motor 64 (step 44), and it is judged whether the LI access retry flag is 1 or not (step 45). In the initial operation, the LI access retry flag is 0, not 1. Hence, the timer for determining the driving time of traverse motor 64 is set to 240 mS (step 46). The operation at step 47 when the LI access retry flag is 1 is described later.

Referring next to FIG. 4, traverse motor 64 is driven in reverse direction (in the direction of outer periphery) (step 48). Judging if surpassing or not the timer duration T (T=240 mS in this embodiment) for determining the driving time of traverse motor 64 (step 49), if not surpassed yet, traverse motor 64 is driven continuously. If surpassed, traverse motor 64 is stopped (step 50). As a result, optical pickup 63 is moved to an outer circumferential position at least from start position of lead-in LI (1) of disc 1 (FIG. 13).

In disc reproducing apparatus 100 (FIG. 1), when set at T=240 mS, the position is moved from the end point of lead-in LI (1) (FIG. 13) at ordinary temperature to a position of about 3 minutes of the time indicated by sub-code information. When optical pickup 63 is moved to this position, it is required to access lead-in LI (1) (FIG. 13) in order to read TOC information next time. Reading again the sub-code information (step 51), it is judged whether the present position is within lead-in area or not (step 52).

As shown in FIG. 13, a short 20-second CD-DA data tune is recorded in a first session of this disc, and CD-ROM data is recorded in a second session. Therefore, at the position of about 3 minutes of sub-code information, lead-in area LI (2) (FIG. 13) of second session is present. At the present, since optical pickup 63 is positioned in lead-in area LI (2) (FIG. 13) of the second session, reading of TOC information (TOC2) of lead-in area LI (2) (FIG. 13) of the second session is started (step 53), and reading is completed (step 55). That is, operation of making 32 kicks is not executed in the direction of inner periphery at step 53.

Control unit 4 (FIG. 1) detects START TNO (beginning program track number of the session) of the session from the TOC information being read in (TOC2), and detects the start position of the beginning track (step 56). As a result of detection, first session judging unit 8 (FIG. 1) judges whether the track start time is within 1 minute or not from initial reproduction of the disc (step 57). If within 1 minute, the read TOC information is judged to be the information of lead-in of the first session (step 57). In this example, the accessed session is a second session, and the value of 2 minutes and 54 seconds is obtained for its lead-in area LI (2), and hence it is judged that the start time is not within 1 minute (NO at step 57). That is, it is not judged not to be the first session. This limit of "within 1 minute" is determined because the second session does not exist at position of the time of about 1 minute according to the standard format of multi-session disc. Later, LI access retry flag (step 58) is set to 1, and the process returns to step 42 (FIG. 3).

Referring again to FIG. 3, control unit 4 (FIG. 1) drives traverse motor 64 to move optical pickup traverse 62 in the direction of inner periphery (step 42), and optical pickup traverse 62 is positioned nearly on the innermost periphery of disc 1. When the optical pickup comes nearly to the innermost periphery of the disc, innermost peripheral position detecting switch 60 is turned on. When it is detected that position detecting switch 60 is turned on (step 43), traverse motor 64 is stopped (step 44), and it is judged whether the LI access retry flag is 1 or not (step 45).

At the present, the LI access retry flag is 1, and the timer for determining the driving time of traverse motor 64 is set at 180 mS (step 47). Referring again to FIG. 4, traverse motor 64 is driven in reverse direction (in the direction of outer periphery) (step 48). Judging if surpassing or not the timer duration T (180 mS in this case) for determining the driving time of traverse motor 64 (step 49), if not surpassed yet, traverse motor 64 is driven continuously. If surpassed, traverse motor 64 is stopped (step 50). As a result, optical pickup 63 is moved to an outer circumferential position at least from start position of lead-in LI (1) (FIG. 13) of session 1.

In this embodiment, supposing optical pickup 63 is moved to a position corresponding to about 1 minute of sub-code when traverse motor 64 is driven for 180 mS. By the move of optical pickup 63, since optical pickup 63 is positioned in a session ahead (at inner periphery side) of lead-in area LI (2) (FIG. 13) of the second session of disc 1, and hence operation of making 32 kicks is executed in the direction of inner periphery (step 53), and reading of TOC information 1 is completed by accessing the lead-in area LI (1) (FIG. 13) of the first session. This process is executed at steps 51, 52, 54, and 55.

Control unit 4 (FIG. 1) detects START TNO of the session from the TOC information being read in (TOC1), and detects the start time corresponding to the start absolute address value of the TNO (step 56). As a result of detection, first session judging unit 8 (FIG. 1) judges whether the reproduction start time of the track is within 1 minute or not from initial reproduction of the disc (step 57). If within 1 minute, the read TOC information is judged to be the information of lead-in of the first session (YES at step 57). In this example, the actually accessed session is the TOC information (TOC1) of lead-in area of first session, and the value of 0 minute and 2 seconds is obtained for the start time of the beginning track (TNO1), and hence the start time is judged to be within 1 minute (step 36). That is, it is accurately judged to be the first session. A display device (not shown) shows the information of the first session (total number of tunes: 1, total reproduction time: 20 seconds) which is part of TOC information 1.

When the user manipulates to start reproduction by pressing PLAY key (not shown) or the like, disc reproducing apparatus 60 refers to the stored TOC information 1, and investigates the start time of a designated tune, and accesses correctly the position corresponding to the time, thereby starting reproduction.

At step 57 explained above, START TNO of the session is detected on the basis of the information in the lead-in, and it is judged whether it is the lead-in of the first session or not by seeing if the start time of the TNO shows a position of within 1 minute from start of reproduction of the disc or not. But this value is arbitrary, as far as 3 seconds or more to less than 2 minutes and 35 seconds.

The present invention comprises first session judging unit 8 for judging whether it is lead-in area of first session or not. However, by detecting the START TNO of the session on the basis of the information in the lead-in, if the start time of TNO is a certain value or more (for example, 4 seconds or more), it may be judged to be information of lead-in after the second session, so that the access may be retried on lead-in of the first session.

In the specification, the driving time of the traverse motor for retry on the lead-in of the first session is explained as 240 mS and 180 mS only. But these values may be freely selected depending on the mechanism, and the number of retry times may be set at a given value. For example, when retrying repeatedly, by gradually decreasing the driving time, for example, 240 mS, 180 mS, 150 mS, 120 mS, the moving distance of the optical pickup can also be decreased gradually.

The invention claimed is:

1. A reproducing apparatus of a multi-session disc mixing a session of first type and a session of different type which is different from the first type, comprising:
   an optical pickup capable of having an access to the session of first type and the session of different type,
   a judging unit for judging the type of the session accessed by the optical pickup, and
   a limiting unit for limiting the reproduction of the session of different type when the session of different type is present in the session judged by the judging unit,
   wherein said judging unit judges a first accessed session of the disc innermost peripheral portion as the session of first type, and further judges the sessions subsequently accessed, and
   wherein said limiting unit defines, when a session of different type is found by the judging unit, the session of first type existing immediately before the session of different type as a final session, and limits only the session of first type as a reproducible session.

2. The reproducing apparatus according to claim 1, wherein the data stored in the session of first type is data to be used by a computer, and the data stored in the session of different type is audio data.

3. The reproducing apparatus according to claim 1, wherein the data stored in the session of first type is audio data, and the data stored in the session of different type is data to be used by a computer.

4. The reproducing apparatus according to claim 1, wherein the session of first type and the session of different type are each composed of a lead-in area recording index information including information of reproduction start time measured from a disc innermost peripheral position, program area recording program tracks storing data to be reproduced, and lead-out area, corresponding to the start position of each program track, and
   the apparatus further comprises a session judging unit for judging if the lead-in area of a specified session is the lead-in area of a first session of the multi-session disc on the basis of the information of the reproduction start time included in the index information being read out by the optical pickup.

5. The reproducing apparatus according to claim 4, wherein the session judging unit judges the lead-in area of the specified session not to be the area of the fist session when the reproduction start time of the first program track of the specified session is smaller than a specified value.

6. The reproducing apparatus according to claim 4, wherein the session judging unit judges the lead-in area of the specified session not to be the lead-in area of the first session when the reproduction start time of the first program track of the specified session is larger than a specified value.

7. The reproducing apparatus according to claim 6, further comprising an access retry unit for allowing the optical pickup to access other session positioned at inner periphery of the disc when the session judging unit judges the lead-in area of the specified session not to be the lead-in area of the first session.

8. The reproducing apparatus according to claim 7, wherein, on the basis of the access result by the access retry unit, the session judging unit further judges if the lead-in area of other session is the lead-in area of the first session of the multi-session disc or not.

* * * * *

UNITED STATES PATENT AND TRADEMARK OFFICE
CERTIFICATE OF CORRECTION

PATENT NO. : 7,106,674 B2 Page 1 of 1
APPLICATION NO. : 10/467239
DATED : September 12, 2006
INVENTOR(S) : Harigae et al.

It is certified that error appears in the above-identified patent and that said Letters Patent is hereby corrected as shown below:

In column 14, line 15 of the Letters Patent, in claim 5 (Amendment claim 6), "session not to be the area" should read --session to be the lead-in area--.

Signed and Sealed this

Thirteenth Day of March, 2007

JON W. DUDAS
*Director of the United States Patent and Trademark Office*